United States Patent [19]

Moore

[11] Patent Number: 5,154,003
[45] Date of Patent: Oct. 13, 1992

[54] PIVOTED-ARM CALIPER

[76] Inventor: Curtis R. Moore, Rte. 2, #98 Bethel Pl., Washington, W. Va. 26181

[21] Appl. No.: 762,242

[22] Filed: Sep. 18, 1991

Related U.S. Application Data

[63] Continuation of Ser. No. 331,162, Mar. 31, 1989, abandoned.

[51] Int. Cl.⁵ .................................................. G01B 5/08
[52] U.S. Cl. .................................. 33/558.01; 33/783; 33/555.1; 33/709; 33/798
[58] Field of Search ............ 33/558.01, 558.02, 558.04, 33/558.4, 783, 784, 791, 792, 794, 797, 798, 801, 807, 501.08, 501.1, 501.2, 501.5, 709, 711, 544.6, 555.1

[56] References Cited

U.S. PATENT DOCUMENTS

| 454,516 | 6/1891 | Brown | 33/501.2 |
|---|---|---|---|
| 677,574 | 7/1901 | Huestis | 33/558.01 |
| 979,248 | 12/1910 | Ayers, Jr. | 33/544.6 |
| 1,156,694 | 10/1915 | Kopiwski | 33/807 |
| 1,196,789 | 9/1916 | Koelpin | 33/501.1 |
| 1,269,336 | 6/1918 | Taylor . | |
| 1,659,939 | 2/1928 | Avery | 33/801 |
| 2,362,907 | 11/1944 | Levin | 33/555.1 |
| 2,855,687 | 10/1958 | Price | 33/709 |
| 3,333,343 | 8/1967 | Elfast, Jr. | 33/783 |
| 4,468,860 | 9/1984 | Rodengen . | |
| 4,845,646 | 7/1989 | Marquis et al. | 33/784 |

FOREIGN PATENT DOCUMENTS

| 876158 | 5/1953 | Fed. Rep. of Germany | 33/792 |
|---|---|---|---|
| 1000736 | 2/1983 | U.S.S.R. . | |
| 1201761 | 12/1985 | U.S.S.R. . | |
| 0015850 | of 1905 | United Kingdom | 33/801 |

Primary Examiner—William A. Cuchlinski, Jr.
Assistant Examiner—C. W. Fulton

[57] ABSTRACT

A caliper has a pair of arms which are connected for rotation about a pivot point. Each arm has a tip and a contact surface is connected to one of the arms. The caliper includes a mechanical or electronic indicator which is responsive to the relative position of the arms for providing an indication of a dimension, such as the diameter, radius, circumference, or cross-sectional area, of an object. The caliper has an extended range and can provide an indication of the dimension when the tips of the arms and the contact surface simultaneously contact nondiametrically opposed points on the surface of the object.

29 Claims, 10 Drawing Sheets

PIVOTED-ARM CALIPER

This application is a continuation, of application Ser. No. 07/331,162, filed Mar. 31, 1989 now abandoned.

FIELD OF THE INVENTION

This invention relates to measuring instruments, and more particularly, to a pivoted-arm caliper for measuring a wide range of diameters.

BACKGROUND OF THE INVENTION

Pivoted-arm calipers are used extensively to measure the diameters of cylindrical and spherical objects. The caliper of U.S. Pat. No. 1,269,336 to Taylor is typical of pivoted-arm calipers which are presently available and includes a pair of curved arms which are rotatably connected at a pivot point. Each arm has a single free end or tip for contacting the surface of an object to be measured.

The first arm has a scale and the second arm has an indicating finger which moves relative to the scale as the angle between the arms changes. The scale is calibrated in such a manner that the position of the indicating finger with respect to the scale provides a measure of the straight-line distance between the free ends of the arms.

The caliper of U.S. Pat. No. 1,269,336 and other presently available pivoted-arm calipers determine the diameter of an object by direct measurement of the straight-line distance between two points on the surface of the object which are diametrically opposed, that is, two points which are opposite endpoints of a diameter. Such calipers use a two-point technique which requires that the free ends of the arms simultaneously contact two diametrically opposed points on the surface of the object.

The range of presently available pivoted-arm calipers is significantly limited by this requirement. When measuring the outside diameter of a spherical object, for instance, the largest diameter such calipers are capable of measuring is only approximately one and one-third times greater than the straight-line distance from the free end of a caliper arm to the pivot point.

Therefore, with presently available pivoted-arm calipers, the measurement of a circular object having a large diameter requires a correspondingly large caliper. For example, the measurement of a spherical tank with a 20 foot outside diameter presently requires a caliper with arms each having a minimum length of approximately 15 feet from its free end to the pivot point. The limited range of these calipers is a significant disadvantage as it necessitates the use of large, unwieldy calipers when measuring large objects.

Therefore, a need exists for a caliper which has an extended range and which can measure diameters which are much greater in length than the length of the arms of the caliper.

In addition to limiting the range of measurement, the requirement that the free ends of the caliper arms contact diametrically opposed points on the surface of the object also makes it impossible to use presently available pivoted-arm calipers to measure diameters in many commonly occurring situations. For example, access to the object to be measured is often limited to such an extent that the free ends of the caliper arms cannot be placed in contact with diametrically opposed points on the surface of the object. This is frequently the case with pipes, tanks, or other vessels which are partially buried or closely surrounded by other objects. In such situations, the diameter of the object cannot be measured using presently available pivoted-arm calipers.

In addition, many objects which have a radius of curvature, such as right-angle curved ducts, also have a cross section in which the curved portion is less than a half circle. As a result, such objects do not have diametrically opposed points on their surfaces for the free ends of the caliper arms to contact. While such objects do not actually have a diameter, an indication of what the diameter would be if the curved portion were completely circular would be useful as it would permit the radius of curvature to be easily calculated. However, since these objects lack diametrically opposed points, presently available pivoted-arm calipers are unable to provide an indication of diameter.

Accordingly, a need also exists for a caliper which is capable of measuring diameters without contacting diametrically opposed points on the surface of the object.

SUMMARY OF THE INVENTION

It is an object of the present invention to provide an improved pivoted-arm caliper capable of measuring diameters which are many times greater than length of the arms of the caliper.

It is also an object of the present invention to provide an improved pivoted-arm caliper which can measure the diameter of an object without contacting diametrically opposed points on the surface of the object.

It is also an object of the present invention to provide an improved pivoted-arm caliper which can measure other dimensions which are related to the diameter of an object, such as the radius, circumference, or cross-sectional area without contacting diametrically opposed points on the surface of the object.

These and other objects and advantages of the present invention are achieved by a caliper which includes a first arm having a tip, a second arm having a tip, a means for connecting the first and second arms for rotation about a pivot point, a contact surface connected to one of the legs, and a means responsive to the relative position of the first and second arms for indicating a predetermined dimension such as the diameter, radius, circumference, or cross-sectional area of an object when the tip of the first arm, the tip of the second arm, and the contact surface simultaneously contact nondiametrically opposed points on a surface of the object.

DETAILED DESCRIPTION OF THE DRAWINGS

Figure 1A:
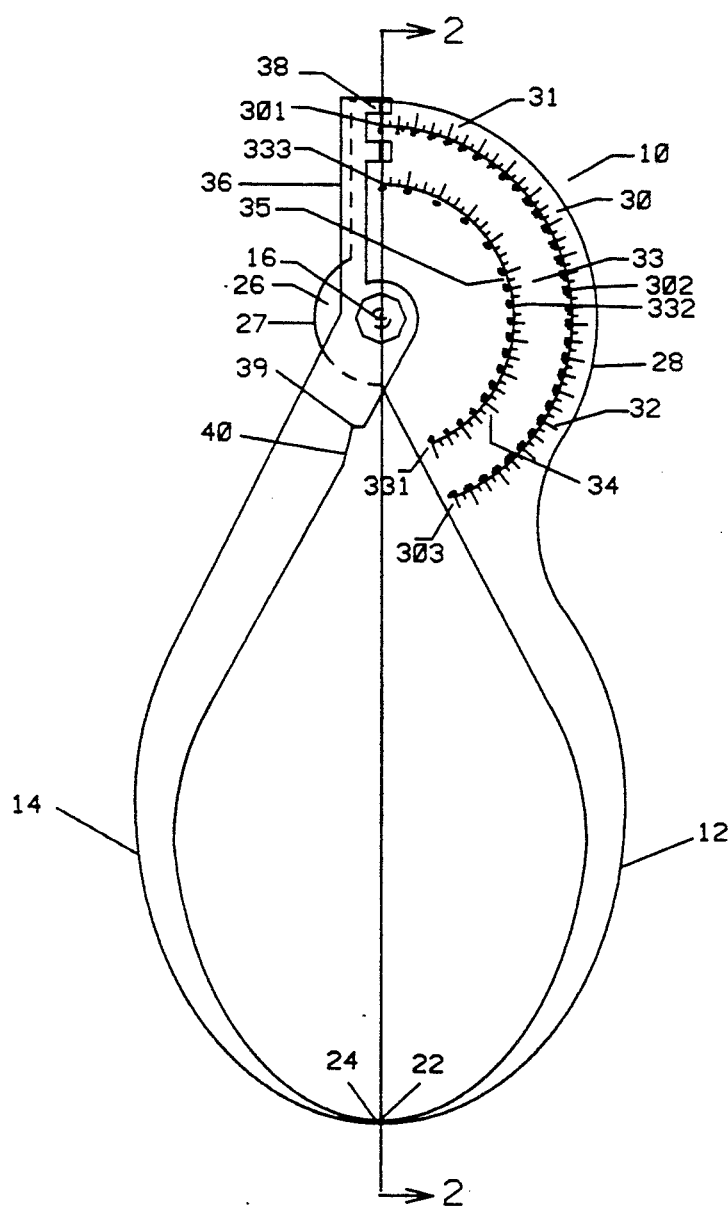
FIG. 1a shows a front view of a first embodiment of a caliper according to the present invention.

FIG. 1a shows a front view of a first embodiment of a caliper according to the present invention. Caliper 10 uses the known two-point technique to directly measure diameters which are less than or equal to a predetermined magnitude. Caliper 10 also uses a novel three-point technique to indirectly measure diameters which are greater than the predetermined magnitude. While the two-point technique requires that caliper 10 contact diametrically opposed points on the surface of the object, the three-point technique does not. As will be apparent from the discussion below, the three-point technique greatly extends the range of caliper 10 and permits the measurement of objects which do not have diametrically opposed points or objects in which such points are inaccessible.

Figure 1B:
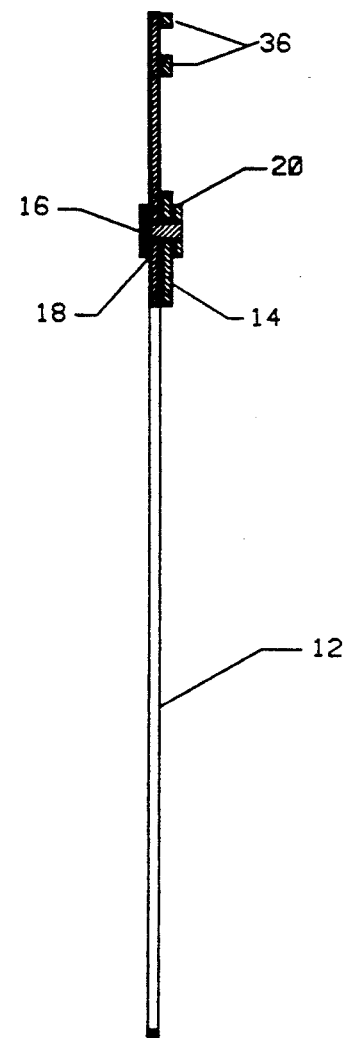
FIG. 1b shows a sectional view of the caliper of FIG. 1a taken along line 2—2.

Caliper 10 includes a pair of elongated members or curved arms 12 and 14 which are connected near a first end by fastener 16. As shown in the cross-section of caliper 10 in FIG. 1b, fastener 16 passes through holes 18 and 20 in arms 12 and 14, respectively, and defines a pivot point about which arms 12 and 14 are capable of rotating. Arms 12 and 14 each have a second, free end. The free end of arm 12 terminates in a pointed tip 22. The free end of arm 14 terminates in a pointed tip 24.

Arm 12 has a contact surface 26 located near its first end. Contact surface 26 has an edge 27 which is semicircular in shape with all points on edge 27 being equidistant from the pivot point. When caliper 10 is used to measure an object with the three-point technique described below, a point on edge 27 of contact surface 26 contacts a point on the surface of the object. The semicircular shape of contact surface 26 maintains the pivot point at a constant distance from the point contacted on the surface of the object. While contact surface 26 is preferably connected to arm 12 so as to extend from arm 12 as shown, it could instead be connected to arm 14 so as to extend from arm 14. Alternatively, contact surface 26 could be a flat disk having a hole at its center through which fastener 16 can pass to connect contact surface 26 to leg 12. Arm 12 also has a scale surface 28 which is located adjacent contact surface 26. Scale surface 28 is marked with an outside diameter scale 30 and an inside diameter scale 33.

Indicating arm 36 extends from the first end of arm 14 and is marked with an indicating line 38 to serve as a pointer on outside diameter scale 30. A notch 39 in arm 14 includes an edge 40 which serves as a pointer on inside diameter scale 33. The position of indicating line 38 and edge 40 with respect to scales 30 and 33, respectively, is dependent upon the relative position of legs 12 and 14. When caliper 10 is used with either the two-point or three-point technique as described below, the position of indicating line 38 and edge 40 with respect to scales 30 and 33 provides an indication of the diameter of the object.

Outside diameter scale 30 extends from graduation 301 to graduation 303 and has a first scale portion 31 and a second scale portion 32. First scale portion 31 extends from graduation 301 to graduation 302. Second scale portion 32 makes up the rest of outside diameter scale 30.

Figure 3A:
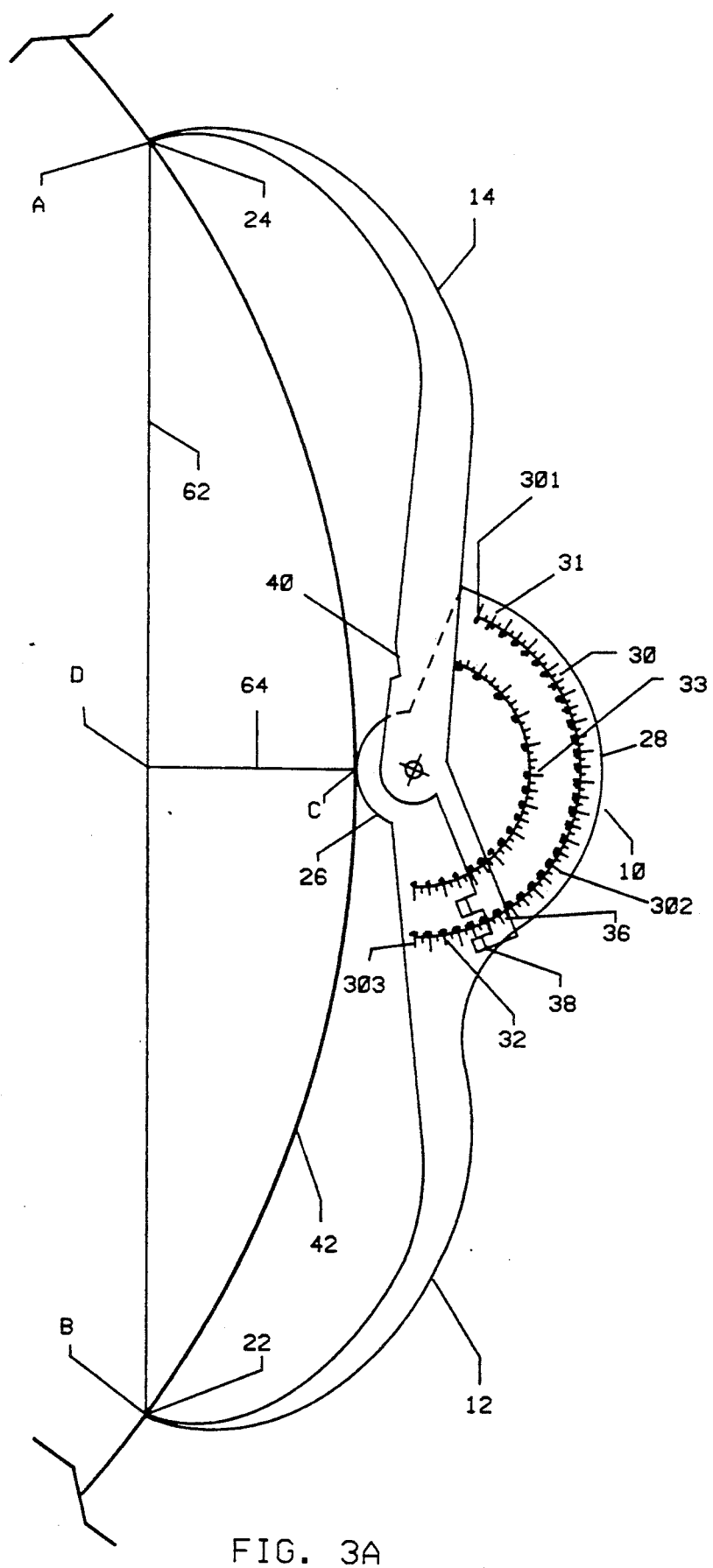
FIG. 3a shows the use of the caliper of FIG. 1a to indirectly measure an outside diameter.
Figure 3B:
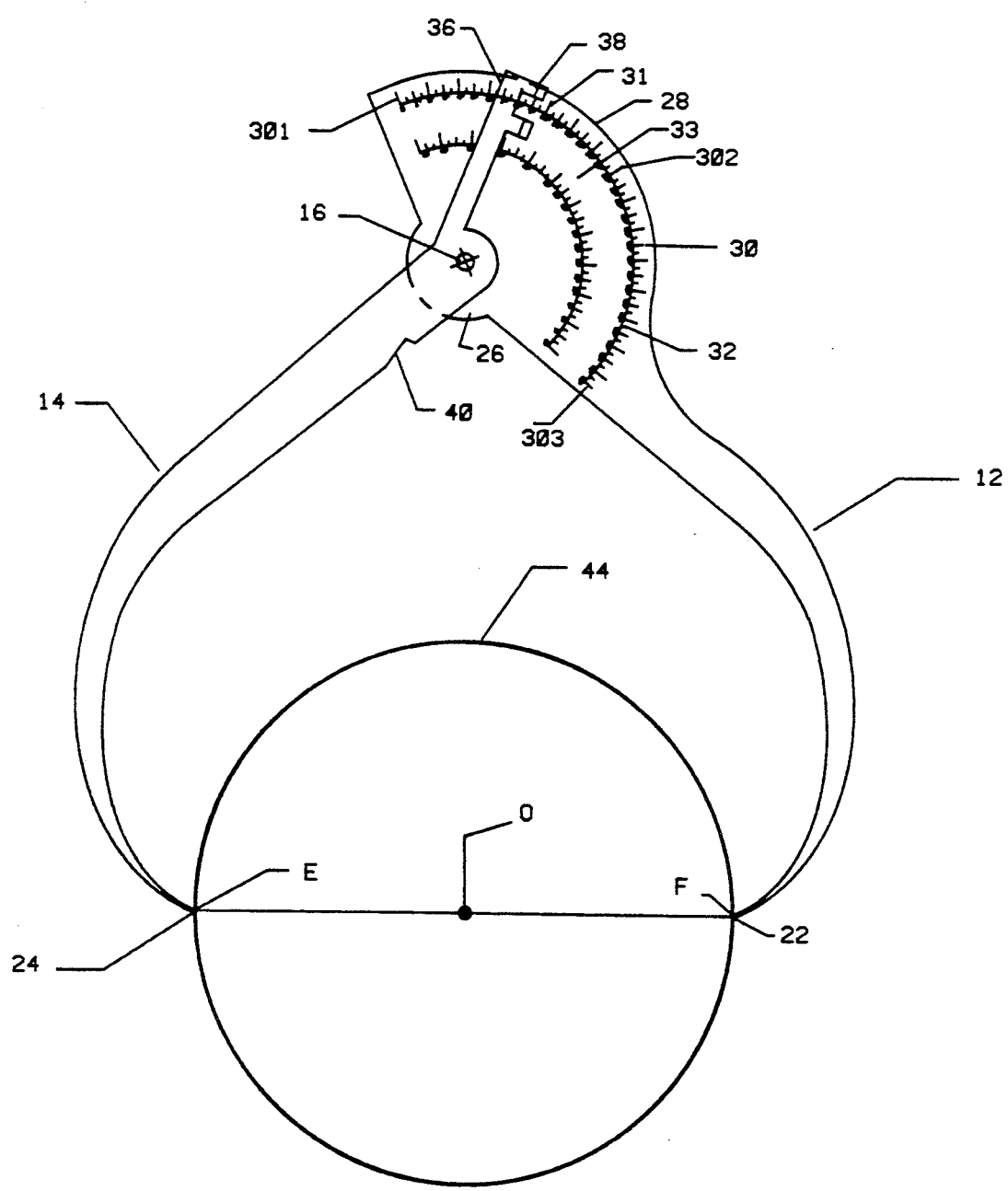
FIG. 3b shows the use of the caliper of FIG. 1a to directly measure an outside diameter.

First scale portion 31 is calibrated according to the function $y=2x$, where y is the indicated diameter and $2x$ is the straight-line distance between tips 22 and 24, as seen in FIG. 3b. The range of scale portion 31 extends from a minimum value of "0" at graduation 301 to a maximum value at graduation 302. Indicating line 38 is aligned with graduation 301 when tips 22 and 24 contact one another, as shown in FIG. 1a. Indicating line 38 is aligned with graduation 302 when the relative position of arms 12 and 14 is such that the length of a first line segment extending from tip 22 to tip 24 is equal to twice the length of a second line segment which is perpendicular to the first line segment and extends from the midpoint of the first line segment to edge 27 of contact surface 26.

First scale portion 31 is used with the two-point technique to directly measure outside diameters which are less than or equal to the maximum value corresponding to graduation 301. When tips 22 and 24 simultaneously contact diametrically opposed points on the outside surface of an object, the straight-line distance between tips 22 and 24, as indicated by the position of line 38 with respect to scale portion 31, is equal to the outside diameter of the object.

Figure 2:
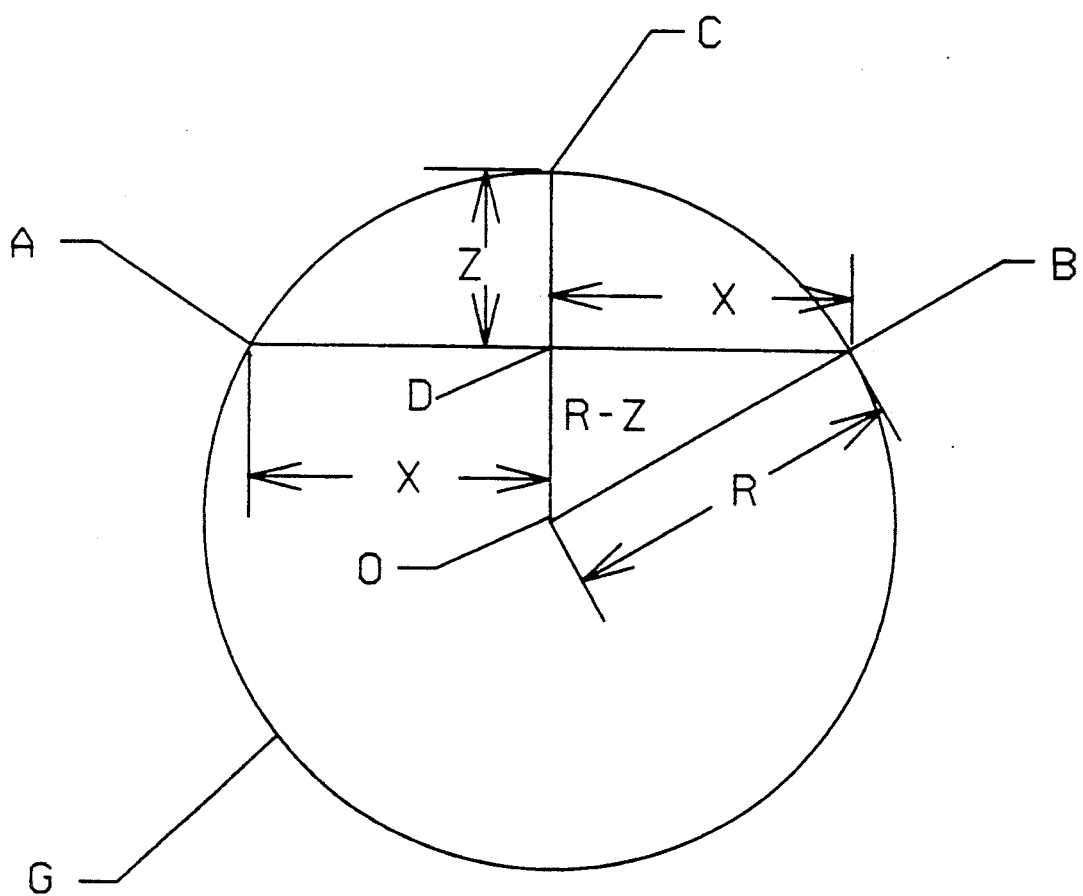
FIG. 2 illustrates the principle on which the present invention is based.

Second scale portion 32 is used with a three-point technique which requires tips 22 and 24 and edge 27 of contact portion 26 to simultaneously contact three non-diametrically opposed points on the outside surface of the object as shown in FIG. 3a. Second scale portion 32 is calibrated according to the function $y=x2/z+z$ for values of x which are greater than z, where y is the indicated diameter, x is one-half of the length of a first line segment extending from tip 22 to tip 24, and z is the length of a second line segment which is perpendicular to the first line segment and extends from the midpoint of the first line segment to edge 27 of contact surface 26. As will be apparent from the discussion with respect to FIG. 2 below, when tips 22 and 24 and edge 27 of contact portion 26 simultaneously contact three non-diametrically opposed points on the outside surface of the object, the position of line 38 with respect to second scale portion 32 provides a measure of the outside diameter of the object.

With second scale portion 32, caliper 10 is able to indirectly measure outside diameters of objects which are so large that tips 22 and 24 cannot contact diametrically opposed points on the outside surface of the object. As a result, second scale portion 32 greatly extends the range of caliper 10. Accurate measurement of outside diameters which are up to eight times greater than the distance from tip 22 to the pivot point can easily be performed on second scale portion 32. Second scale portion 32 also permits caliper 10 to be used to measure objects in which diametrically opposed points are absent or inaccessible.

Inside diameter scale 33 extends from graduation 331 to graduation 333 and has a first scale portion 34 and a second scale portion 35. First scale portion 34 extends from graduation 331 to graduation 332. Second scale portion 35 makes up the rest of inside diameter scale 33.

Figure 4A:
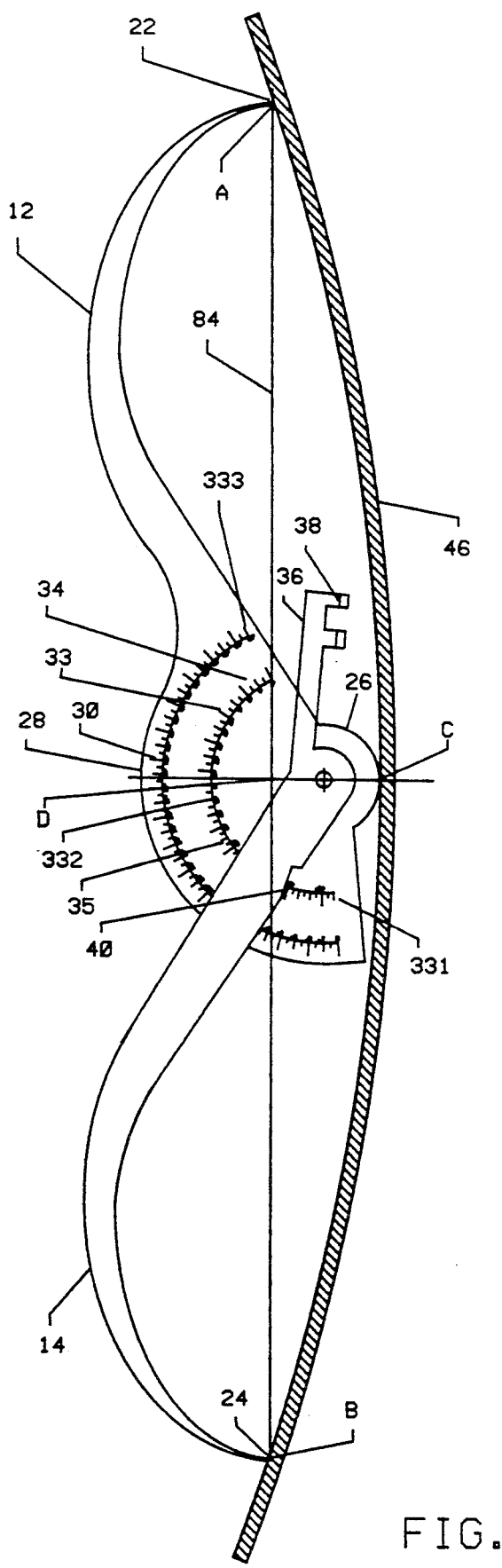
FIG. 4a shows the use of the caliper of FIG. 1a to indirectly measure an inside diameter.
Figure 4B:
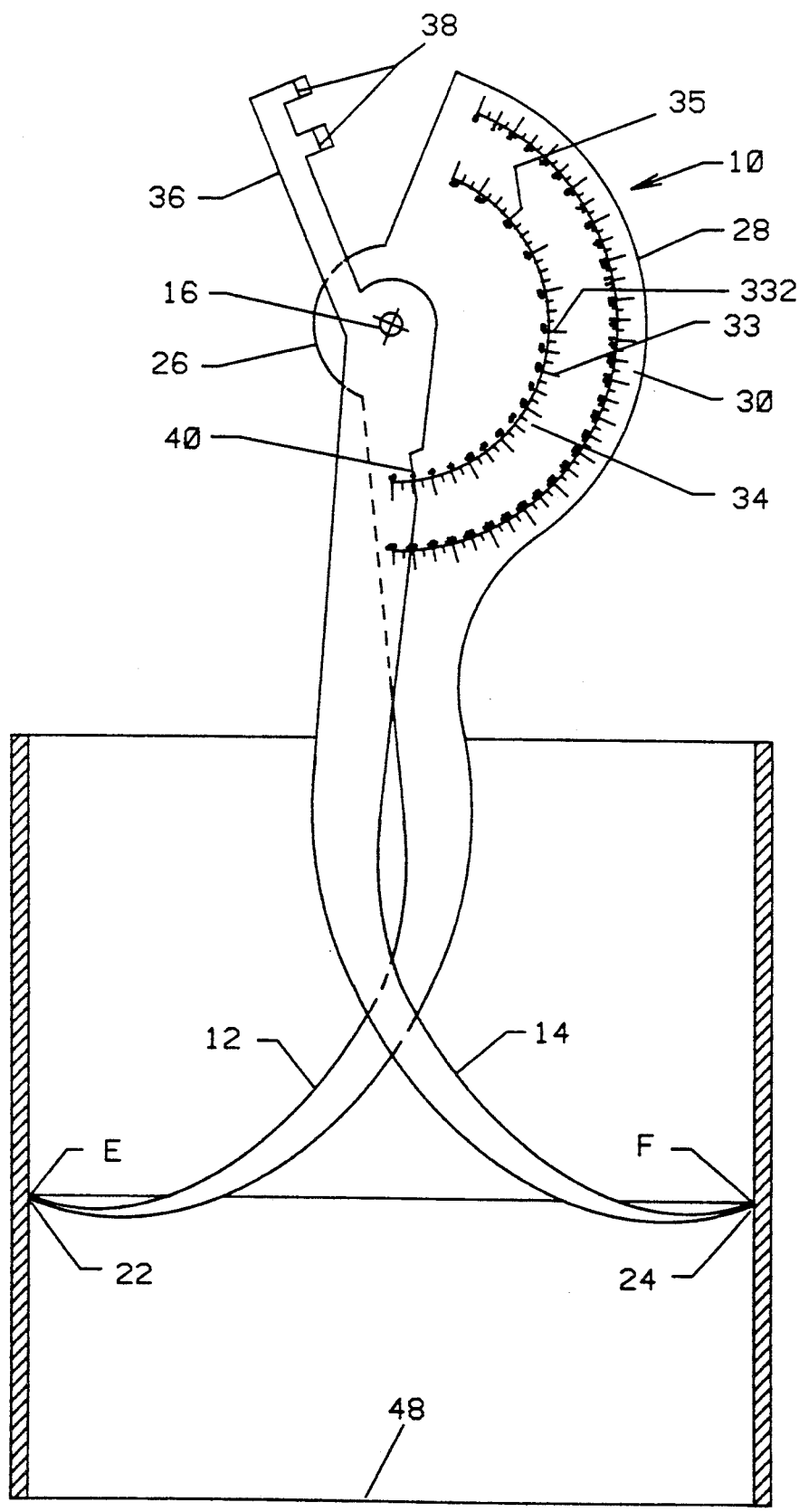
FIG. 4b shows the use of the caliper of FIG. 1a to directly measure an inside diameter.

First scale portion 34 is calibrated according to the function $y=2x$, where y is the indicated diameter and $2x$ is the straight-line distance between tips 22 and 24, as seen in FIG. 4b. The range of scale portion 34 extends from a minimum value at graduation 331 to a maximum value at graduation 332. Indicating edge 40 is aligned with graduation 332 when the relative position of arms 12 and 14 is such that the length of a first line segment extending from tip 22 to tip 24 is equal to twice the length of a second line segment which is perpendicular to the first line segment and extends from the midpoint of the first line segment to edge 27 of contact surface 26.

First scale portion 34 is used with the two-point technique to directly measure inside diameters which are less than or equal to the maximum value corresponding to point 332. When tips 22 and 24 simultaneously contact diametrically opposed points on the inside surface of an object, the straight-line distance between tips 22 and 24, as indicated by the position of edge 40 with respect to scale portion 34, is equal to the inside diameter of the object.

Second scale portion 35 is used with the three-point technique which requires tips 22 and 24 and edge 27 of contact portion 26 to simultaneously contact three non-diametrically opposed points on the inside surface of the object as shown in FIG. 4a. Second scale portion 35 is calibrated according to the function $y = x^2/z + z$ for values of x which are greater than z, where y is the diameter, x is one-half of the length of a first line segment extending from tip 22 to tip 24, and z is the length of a second line segment which is perpendicular to the first line segment and extends from the midpoint of the first line segment to edge 27 of contact surface 26. As will be apparent from the discussion with respect to FIG. 2 below, when tips 22 and 24 and contact portion 26 simultaneously contact three non-diametrically opposed points on the inside surface of the object, the position of edge 40 with respect to second scale portion 35 provides a measure of the inside diameter of the object.

With second scale portion 35, caliper 10 is able to indirectly measure inside diameters of objects which are so large that tips 22 and 24 cannot contact diametrically opposed points on the inside surface of the object. As a result, second scale portion 35 also greatly extends the range of caliper 10. Accurate measurement of inside diameters which are up to eight times greater than the distance from tip 22 to the pivot point can easily be performed on second scale portion 35. Second scale portion 35 also permits caliper 10 to be used to measure objects in which diametrically opposed points are absent or inaccessible.

The three-point technique used by the present invention is based on the principle, illustrated in FIG. 2, that when the length of a chord of a circle is known and the length of the line segment which is perpendicular to the chord and extends from the midpoint of the chord to a point on the circle is also known, the length of the circle's diameter can be determined. As shown in FIG. 2, where the length of the chord from points A to B on circle G is known to be 2x, the length of the line segment from the midpoint D of the chord to point A must be x. Where the length of a line segment perpendicular to the chord and extending from the midpoint D of the chord to point C on the circle is known to be z, the length of the line segment from point D to the center of the circle, O, must be r-z, where r is the unknown length of the radius. As seen in FIG. 3, line segments DB and DO are the perpendicular sides of a right triangle whose hypotenuse, line segment OB is a radius of unknown length r. From the Pythagorean Theorem:

$$x^2 + (r-z)^2 = r^2 \quad (1)$$

Expanding and combining terms yields:

$$x^2/z + z = 2r = \text{diameter} \quad (2)$$

Therefore, whenever x and z are known, the diameter can be calculated using equation (2). Points A, B, and C correspond to the nondiametrically opposed points on the surface of an object contacted simultaneously by tips 22 and 24 and edge 27 of contact surface 26 when caliper 10 uses the three-point technique. Distance x corresponds to one-half of the length of a first line segment extending from tip 22 to tip 24. Distance z corresponds to the length of a second line segment which is perpendicular to the first line segment and extends from the midpoint of the first line segment to a point on edge 27 of contact surface 26.

To calibrate scale portion 32, arms 12 and 14 are positioned so that tips 22 and 24 face each other as shown in FIG. 3a. Arms 12 and 14 are then moved through a plurality of different relative positions by varying the angle between the arms in small increments. Values of x and z are measured at each different relative position of arms 12 and 14 at which x is greater than z. The diameter is calculated at each relative position using equation (2) and scale portion 32 marked accordingly.

To calibrate scale portion 35, arms 12 and 14 are positioned so that tips 22 and 24 face away from each other as shown in FIG. 4a. Arms 12 and 14 are then moved through a plurality of different relative positions by varying the angle between the arms in small increments. Values of x and z are measured at each different relative position of arms 12 and 14 at which x is greater than z. The diameter is calculated at each relative position using equation (2) and scale portion 35 marked accordingly.

In addition to indicating diameter, scales 30 and 33 could also be calibrated to provide an indication of other dimensions which are a function of the diameter, such as the radius, circumference, or cross-sectional area. To provide an indication of radius, scale portions 31 and 34 are calibrated according to the function $y = x$ and scale portions 32 and 35 are calibrated according to the function $y = (x^2/z + z)/2$. To provide an indication of circumference, scale portions 31 and 34 are calibrated according to the function $y = 2\pi x$ and scale portions 32 and 35 are calibrated according to the function $y = \pi(x^2/z + z)$. To provide an indication of cross-sectional area, scale portions 31 and 34 are calibrated according to the function $y = \pi x^2$ and scale portions 32 and 35 are calibrated according to the function $y = (\pi/4)(x^2/z + z)2$. For each of these functions, y is the indicated dimension, x is one-half of the length of a first line segment extending from tip 22 to tip 24, and z is the length of a second line segment which is perpendicular to the first line segment and extends from the midpoint of the first line segment to edge 27 of contact surface 26. Scales 30 and 33 could be calibrated to provide indications of any one or any combination of the dimensions.

FIGS. 3a–4b illustrate the operation of caliper 10. While the operation is described with respect to the measurement of the diameter of an object, the operation of caliper 10 would be identical when measuring the radius, circumference, or cross-sectional area of an object.

FIG. 3a shows the use of caliper 10 to indirectly measure the outside diameter of an object 42 which is so large that tips 22 and 24 cannot contact diametrically opposed points on the surface of object 42. Indirect measurement of the diameter is performed using the three-point technique. The relative position of arms 12 and 14 is adjusted until tips 22 and 24 contact points B and A, respectively, on the surface of object 42 while a point on edge 27 of contact surface 26 contacts point C on the surface of object 42. Points B and A are the endpoints of line segment or chord BA. Point C is an endpoint of line segment DC which is perpendicular to line segment BA and extends from the mid-point D of line segment BA to the surface of object 42. The position of indicator line 38 with respect to scale portion 32 indicates the diameter which is equal to $x^2/z+z$, where x is one-half of the distance from point B to point A and z is the distance from point D to point C.

FIG. 3b shows the use of a caliper 10 to directly measure the outside diameter of object 44. The relative position of arms 12 and 14 is adjusted until tips 22 and 24 contact diametrically opposed points F and E on the surface of object 44, which are the endpoints of diameter FE. The position of indicator line 38 with respect to scale portion 31 indicates the diameter which is equal to the straight-line distance between points F and E.

FIG. 4a shows the use of caliper 10 to indirectly measure the inside diameter of an object 46 which is so large that tips 22 and 24 cannot contact diametrically opposed points on the surface of object 46. Indirect measurement of the diameter is performed using the three-point technique. The relative position of arms 12 and 14 is adjusted until tips 22 and 24 contact points A and B, respectively, on the surface of object 46 while a point on edge 27 of contact surface 26 contacts point C on the surface of object 46. Points A and B are the endpoints of line segment or chord AB. Point C is an endpoint of line segment DC which is perpendicular to line segment AB and extends from the mid-point D of line segment AB to the surface of object 46. The position of indicator edge 40 with respect to scale portion 3 indicates the diameter which is equal to $x^2/z+z$, where x is one-half of the distance from point A to point B and z is the distance from point D to point C.

FIG. 4b shows the use of a caliper 10 to directly measure the inside diameter of object 48. The relative position of arms 12 and 14 is adjusted until tips 22 and 24 contact diametrically opposed points E and F on the surface of object 44, which are the endpoints of diameter EF. The position of indicator edge 40 with respect to scale portion 34 indicates the diameter which is equal to the straight-line distance between points E and F.

Figure 5A:
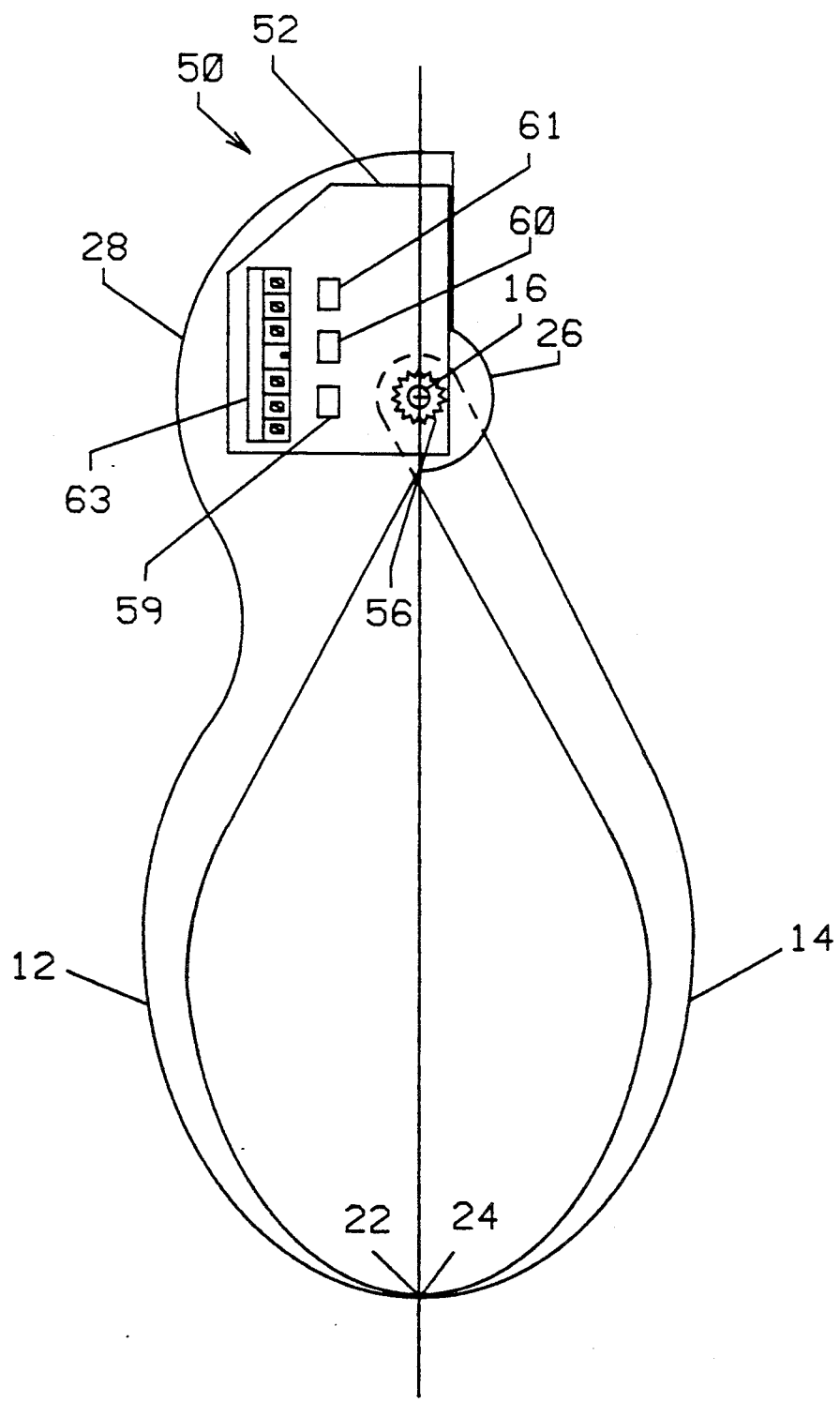
FIG. 5a shows a second embodiment of a caliper according to the present invention.

FIG. 5a shows a second embodiment of a caliper according to the present invention. Caliper 50 includes a pair of curved arms 12 and 14 which are rotatably connected near a first end by fastener 16. Fastener 16 defines a pivot point about which arms 12 and 14 can rotate. Arms 12 and 14 each have a second, free end. The free end of arm 12 terminates in a pointed tip 22. The free end of arm 14 terminates in a pointed tip 24.

Arm 12 has a contact surface 26 located near its first end. Contact surface 26 has an edge 27 which is semicircular in shape with all points on edge 27 being equidistant from the pivot point. Arm 50 also has a surface 28 located adjacent contact surface 26. A housing 52 is mounted on surface 28.

Housing 52 contains circuitry for selectively determining the diameter, radius, circumference, or cross-sectional area of an object in response to a voltage signal from a potentiometer 55 which is connected to arms 12 and 14. Housing 52 also contains push button switches 59, 60, and 61 for selecting the particular dimension to be determined and the units it will be determined in, a display 63 for displaying the selected dimension, and an output port 64 for supplying an output signal indicative of the selected dimension.

Figure 5B:
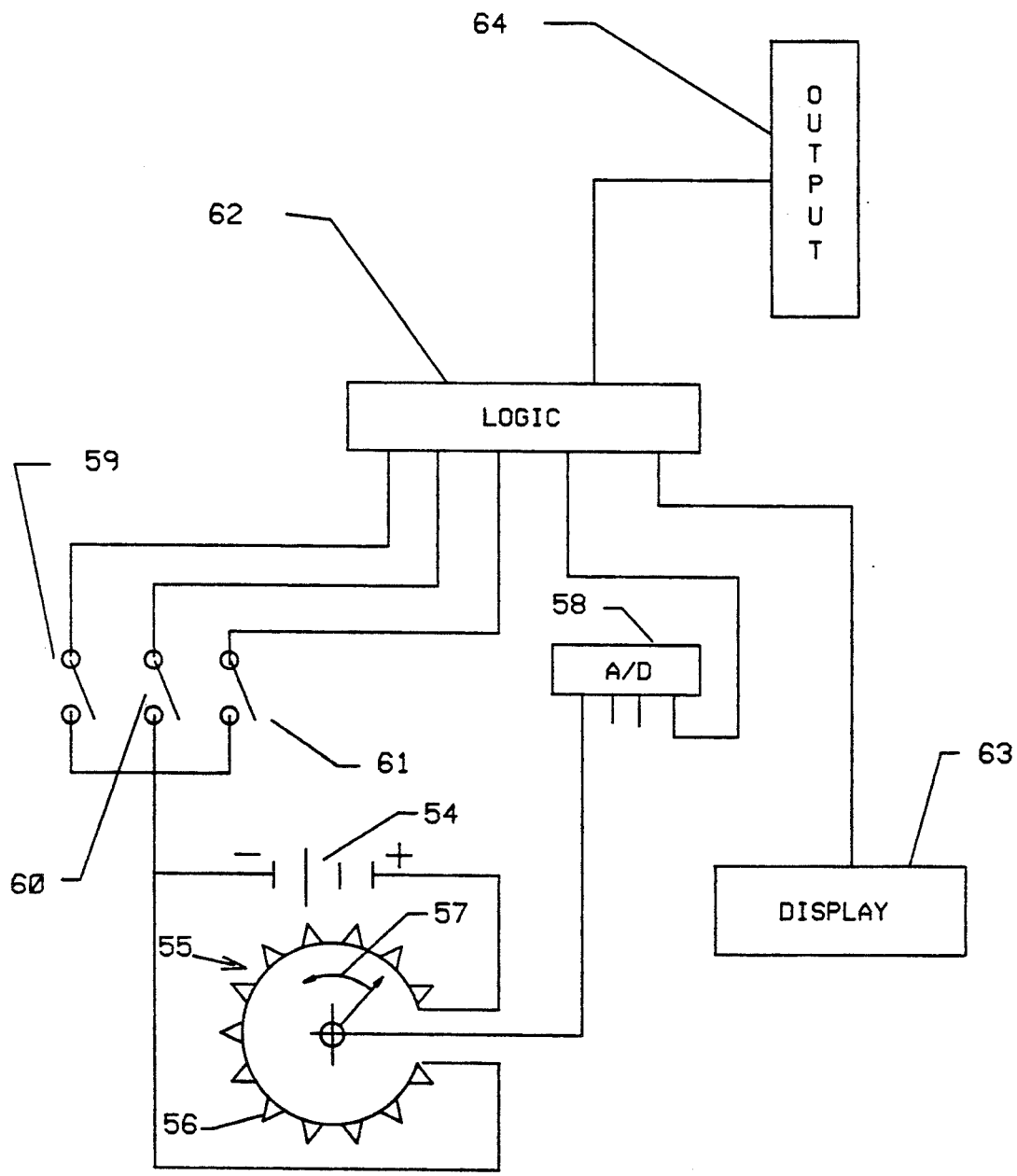
FIG. 5b shows an electrical schematic diagram of the circuit used in the second embodiment.

FIG. 5b shows a schematic diagram of the circuitry used by caliper 50. All of the circuit elements with the exception of potentiometer 55 are contained in housing 52. The circuitry includes a potentiometer 55 which has a resistor 56 and a wiper 57. Resistor 56 is mounted on arm 12 around the pivot point. A battery 54 is connected across resistor 56. Wiper 57 is mounted on arm 14 and rotates about the pivot point with arm 14. Wiper 57 provides an analog voltage signal, which is related to the angle between arms 12 and 14, to analog-to-digital converter 58. Analog-to-digital converter 58 converts the analog voltage signal to a digital signal. Logic circuit 62 receives the digital signal, determines the selected dimension in the selected units, and supplies output signals indicative of the dimension to display 63 and output port 64. Display 63 receives the output signal and displays the dimension. Output port 64 can be used to transmit output signals from logic circuit 62 to a remote location where the output signals may, for example, be recorded or used in the control of a machining operation.

Push button switches 59, 60, and 61 are connected between battery 54 and logic circuit 62. Each of the switches has an actuated or ON state and an unactuated or OFF state. The actuated state is achieved when a switch is pressed by an operator. The switches are biased, for example by a spring, so as to automatically return to the unactuated state when released by the operator.

Push button switch 59 is used to select either diameter, circumference, radius, or cross-sectional area as the dimension to be determined. Logic circuit 62 normally supplies output signals to display 63 and output port 64 which are indicative of the diameter of an object being measured. Logic circuit 62 responds to actuation of switch 59 to produce output signals indicative of a different dimension. Successive actuation of switch 59 causes logic circuit 62 to cycle through the available dimensions which may be determined. For example, successively pressing switch 59 four times will cause the dimension determined by logic circuit 62 to cycle from diameter to circumference to radius to cross-sectional area and back to diameter.

Push button switch 60 is used to select either English or metric units as the units in which the selected dimension is determined. Logic circuit 62 normally supplies output signals to display 63 and output port 64 which are indicative of the selected dimension determined in English units. Logic circuit 62 responds to actuation of switch 60 to change the units in which the dimension is determined. Successive actuation of switch 60 will toggle between English and metric units.

Push button switch 61 is used to select either feet or inches as the base unit when the dimension is determined in English units and to select either meters or centimeters as the base unit when the dimension is determined in metric units. Logic circuit 62 normally provides output signals to display 63 and output port 64 which are indicative of the selected dimension in either feet when English units have been selected or meters when metric units have been selected. Logic circuit 62 responds to actuation of switch 61 to change the base units in which the dimension will be determined. Successive actuation of switch 61 will toggle between feet and inches when English units have been selected or between meters and centimeters when metric units have been selected.

While switches 59, 60, and 61 are preferably push button switches, other types of switches, such as rotary switches, could also be used.

Caliper 50, like caliper 10, measures inside and outside dimensions using the two-point and three-point techniques described in FIGS. 3a–4b. The two-point technique is used to measure dimensions of an object whose size permits tips 22 and 24 to contact diametrically opposed on the surface of the object. When used with the two-point technique, the output signals produced by logic circuit 62 are indicative of dimensions determined according to the following functions:

1) $y = 2x$ when determining diameter;
2) $y = 2\pi x$ when determining circumference;
3) $y = x$ when determining radius; and
4) $y = \pi x^2$ when determining cross-sectional area.

The three-point technique is used to measure dimensions of an object whose size will not permit tips 22 and 24 to contact diametrically opposed on the surface of the object. When used with the three-point technique, the output signals produced by logic circuit 62 are indicative of dimensions determined according to the following functions:

1) $y = x^2/z + z$ when determining diameter;
2) $y = \pi(x^2/z + z)$ when determining circumference;
3) $y = (x^2/z + z)/2$ when determining radius; and
4) $y = (x/4)(x^2/z + z)^2$ when determining cross-sectional area.

For each of these functions, y is the dimension to be determined, x is one-half of the length of a first line segment extending from tip 22 to tip 24, and z is the length of a second line segment which is perpendicular to the first line segment and extends from the midpoint of the first line segment to edge 27 of contact surface 26.

Figure 5C:
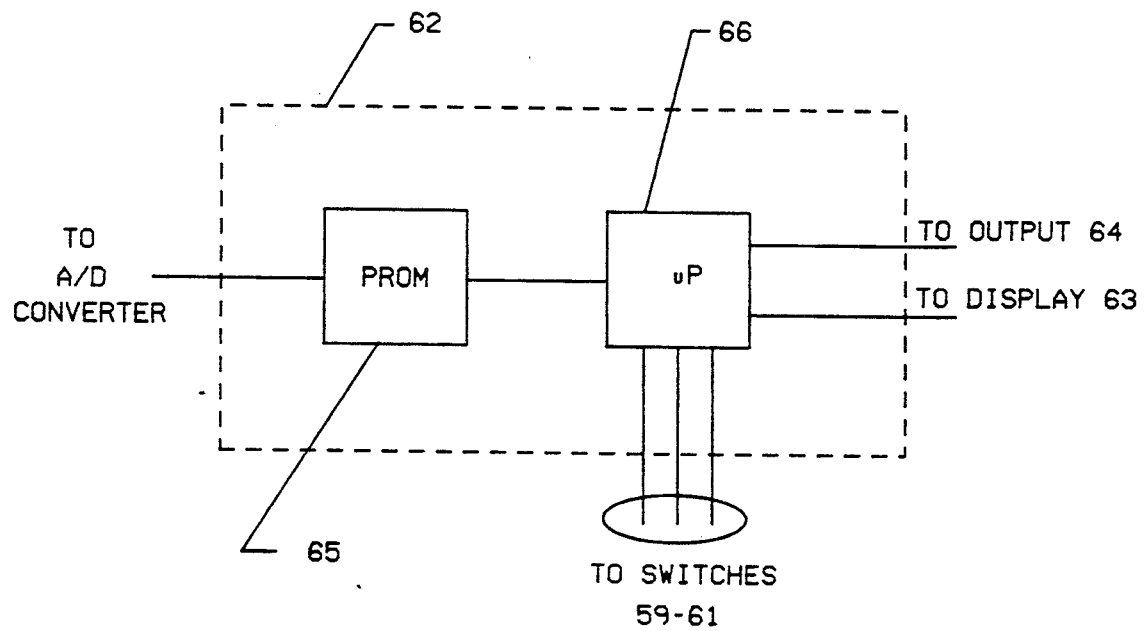
FIG. 5c is a schematic diagram of the logic circuit of FIG. 5b.

As seen in FIG. 5c, logic circuit 62 may comprise a programmable read-only memory (PROM) 65 connected to a microprocessor 66. PROM 65 stores a lookup table of diameters in units of feet. The digital signal output by analog-to-digital converter 58 is applied as an address to PROM 65. The diameter corresponding to the address is read out of PROM 65 and applied to microprocessor 66. Microprocessor 66 monitors switches 59, 60, and 61 to determine which dimension has been selected, whether English or metric units have been selected, and which base unit has been selected.

When a dimension other than the diameter has been selected using switch 59, microprocessor 66 converts the diameter value supplied by PROM 65 to a value corresponding to the selected dimension. Microprocessor 66 multiplies the diameter value by ½ to convert to the radius, multiplies the diameter value by $\pi$ to convert to the circumference, and squares the diameter value and multiplies the squared value by $\pi/4$ to convert to the cross-sectional area.

When metric units have been selected using switch 60, microprocessor 66 converts the value of the selected dimension from feet to meters. When smaller base units have been selected using switch 61, microprocessor 66 converts the value of the selected dimension from feet to inches or meters to centimeters.

PROM 65 may be programmed with the appropriate inside and outside diameter values by moving arms 12 and 14 through a plurality of different relative positions, for example, by varying the angle between the arms from 0 to 360 degrees in small increments. At each relative position, the output of analog-to-digital converter 58 is measured as are distances x and z, where x is one-half of the length of a first line segment extending from tip 22 to tip 24, and z is the length of a second line segment which is perpendicular to the first line segment and extends from the midpoint of the first line segment to edge 27 of contact surface 26. The diameter at each relative position is then calculated according to the following relationships:

$y = 2x$ for values of $x \geq z$; and
$y = x^2/z + z$ for values of $x > z$;

where y is the diameter. Associated with each calculated diameter is a unique value output by analog-to-digital converter 58. The value of each calculated diameter is then programmed in PROM 65 at the address location corresponding to the output of analog-to-digital converter 58 associated with that diameter.

Figure 5D:
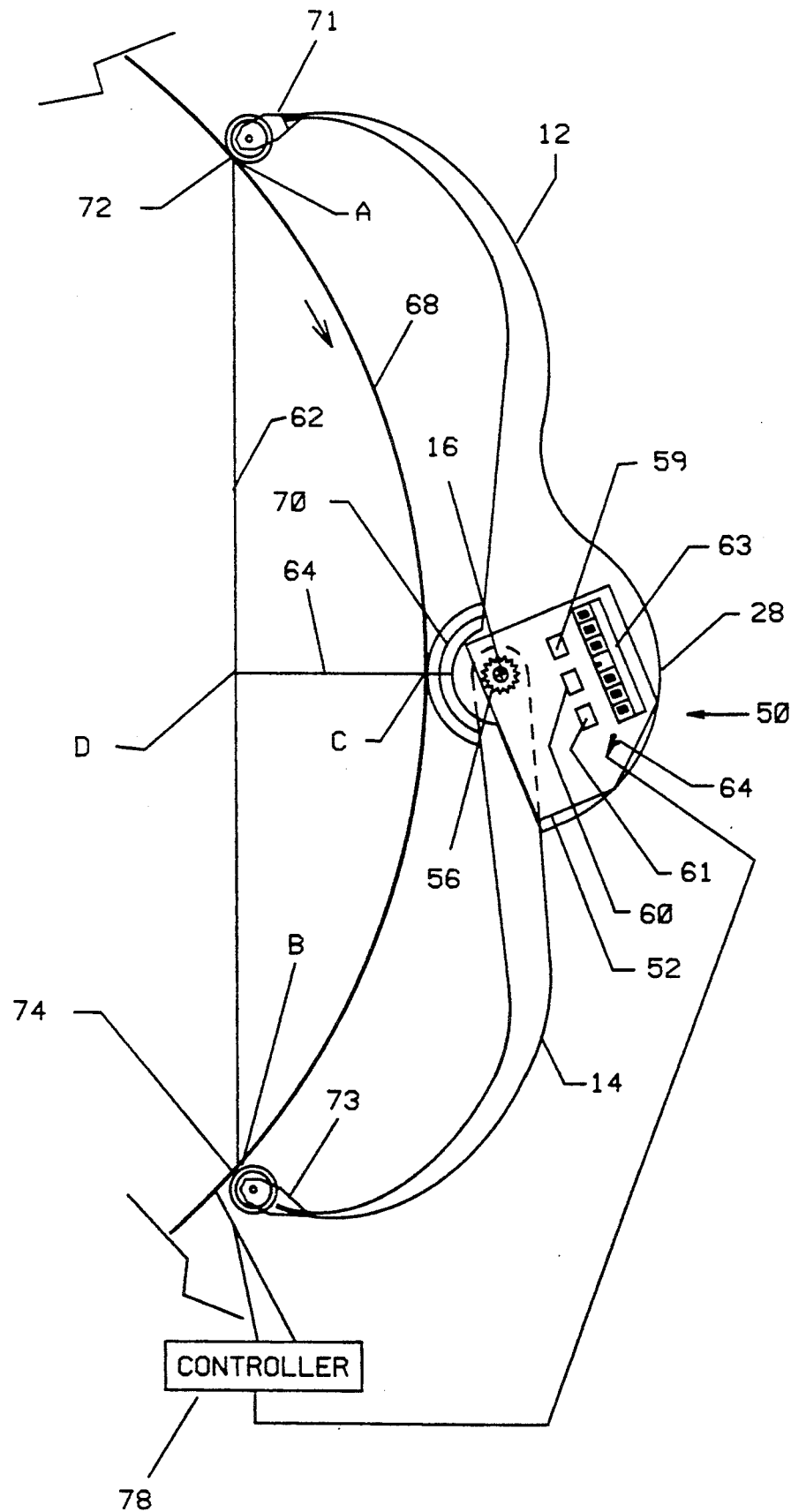
FIG. 5d shows a third embodiment of a caliper according to the invention.

FIG. 5d shows a third embodiment of a caliper according to the present invention. In this embodiment, caliper 50 is modified by the addition of rollers 70, 72, and 74 in order permit rotating objects to be measured. Roller 70 has a hole (not shown) at its center through which fastener 16 passes to rotatably connect roller 70 to arm 14. Roller 72 is mounted in a housing 71 which is connected to the free end of arm 12. Roller 74 is mounted in a housing 73 which is connected to the free end of arm 14. Rollers 70, 72, and 74 rotate when in contact with the surface of a rotating object so that caliper 50 may take measurements while the object is rotating without damaging the object.

Inside and outside dimensions are measured with the two-point technique using caliper 50 of FIG. 5d by placing rollers 72 and 74 in contact with two diametrically opposed points on an object's surface. Inside and outside dimensions are measured with the three-point technique using caliper 50 of FIG. 5d by placing rollers 70, 72, and 74 in contact with three nondiametrically opposed points on an object's surface. In the embodiment of FIG. 5d, roller 70 comprises the contact surface connected to one of the arms while rollers 72 and 74 comprise the tips of arms 12 and 14, respectively.

FIG. 5d shows the modified version of caliper 50 using the three-point technique to measure an outside dimension of an object 68 and control a piece of remote equipment. Cutting tool 76 normally contacts the surface of rotating object 68 to machine object 68 to a desired dimension. Cutting tool controller 78 receives output signals indicative of the measured dimension from output port 64 and retracts cutting tool 76 from the surface of object when the measured dimension equals a desired dimension.

When caliper 50 is to be used with rollers 70, 72, and 74, the method of programming diameter values into PROM 65 is substantially the same as the method of programming PROM 65 when caliper 50 is to be used without rollers described above with respect to FIG. 5c. The only difference is in the measurement of distances x and z at each relative position of arms 12 and 14. When caliper 50 is used with rollers 70, 72, and 74, the distance x is one-half the length of a first line segment extending from roller 72 to roller 74 and the distance z is the length of a second line segment which is perpendicular to the first line segment and extends from the midpoint of the first line segment to roller 70 as shown in FIG. 5d.

For the relative position of arms 12 and 14 shown in FIG. 5d, line segment AB corresponds to the first line segment extending from roller 72 to roller 74. Line segment DC corresponds to the second line segment which is perpendicular to the first line segment and extends from the midpoint of the first line segment to roller 70.

While several embodiments of the present invention have been described, numerous modifications may be made which are within the scope of the invention. For example, an enclosed needle and dial indicator may be used instead of the scale and pointer of the first embodiment.

I claim:

1. A caliper, comprising:
    a first arm having a tip;
    a second arm having a tip;
    a means for connecting the first arm and the second arm for rotation about a pivot point, the pivot point being spaced apart from the tip of the first arm and the tip of the second arm;
    a contact surface connected to one of the arms; and
    a means responsive to the relative position of the first and second arms for indicating a predetermined dimension of an object within a first range of values when the tip of the first arm, the tip of the second arm, and the contact surface simultaneously contact three nondiametrically opposed points on a surface of the object, the predetermined dimension having a predetermined relationship to the length of a first line segment extending from the tip of the first arm to the tip of the second arm and the length of a second line segment which is perpendicular to the first line segment and extends from the midpoint of the first line segment to the contact surface, the indicating means also determining the predetermined dimension of an object within a second range of values when the tip of the first arm and the tip of the second arm simultaneously contact two diametrically opposed points on the surface of the object, the values in the first range being different from the values in the second range.

2. A caliper, as in claim 1, in which the predetermined dimension is the diameter and the indicating means determines the diameter according to the function $y = x^2/z + z$, where y is the diameter, x is one-half of the length of a first line segment extending from the tip of the first arm to the tip of the second arm, and z is the length of a second line segment which is perpendicular to the first line segment and extends from the midpoint of the first line segment to the contact surface.

3. A caliper, as in claim 1, in which the predetermined dimension is the radius and the indicating means determines the radius according to the function $y = (x^2/z + z)/2$, where y is the radius, x is one-half of the length of a first line segment extending from the tip of the first arm to the tip of the second arm, and z is the length of a second line segment which is perpendicular to the first line segment and extends from the midpoint of the first line segment to the contact surface.

4. A caliper, as in claim 1, in which the predetermined dimension is the circumference and the indicating means determines the circumference according to the function $y = \pi(x^2/z + z)$, where y is the circumference, x is one-half of the length of a first line segment extending from the tip of the first arm to the tip of the second arm, and z is the length of a second line segment which is perpendicular to the first line segment and extends from the midpoint of the first line segment to the contact surface.

5. A caliper, as in claim 1, in which the predetermined dimension is the cross-sectional area and the indicating means determines the cross-sectional area according to the function $y = (x/4)(x^2/z + z)^2$, where y is the cross-sectional area, x is one-half of the length of a first line segment extending from the tip of the first arm to the tip of the second arm, and z is the length of a second line segment which is perpendicular to the first line segment and extends from the midpoint of the first line segment to the contact surface.

6. A caliper, as in claim 1, in which the indicating means comprises:
    a first pointer on the first arm; and
    a first scale on the second arm, the first scale including a first scale portion calibrated so that the position of the first pointer with respect to the first scale portion provides an indication of the predetermined dimension of the object when the tip of the first arm, the tip of the second arm, and the contact surface simultaneously contact three nondiametrically opposed points on the surface of the object and a second scale portion calibrated so that the position of the first pointer with respect to the second scale portion provides an indication of the predetermined dimension of the object when the tip of the first arm and the tip of the second arm simultaneously contact two diametrically opposed points on the surface of the object.

7. A caliper, as in claim 6, in which position of the first pointer with respect to the first scale provides an indication of a predetermined outside dimension of an object and the indicating means further comprises:
    a second pointer on the first arm; and
    a second scale on the second arm, the second scale including a first scale portion calibrated so that the position of the second pointer with respect to the first scale portion provides an indication of a predetermined inside dimension of an object when the tip of the first arm, the tip of the second arm, and the contact surface simultaneously contact three nondiametrically opposed points on an inside surface of the object and a second scale portion calibrated so that the position of the second pointer with respect to the second scale portion provides an indication of the predetermined inside dimension of an object when the tip of the first arm and the tip of the second arm simultaneously contact two diametrically opposed points on an inside surface of the object.

8. A caliper, as in claim 1, in which the indicating means comprises:
    a means for producing a first signal which is related to the angle between the first and second arms; and
    a means responsive to the first signal for producing an output signal indicative of the predetermined dimension.

9. A caliper, as in claim 8, in which the means for producing the first signal comprises a potentiometer having a resistor connected to the second arm and a wiper connected to the first arm.

10. A caliper, as in claim 9, in which the means responsive to the first signal comprises:
    an analog-to-digital converter connected to the wiper for converting the first signal to a digital signal; and a logic means connected to the analog-to-digital converter and responsive to the digital signal for determining the predetermined dimension and producing the output signal.

11. A caliper, as in claim 10, in which the indicating means further comprises means connected to the logic means for selecting either the diameter, radius, circumference, or cross-sectional area as the predetermined dimension and for selecting the units in which the predetermined dimension will be indicated.

12. A caliper, as in claim 8, in which the indicating means further comprises;
a display means responsive to the output signal for displaying the predetermined dimension; and
an output port for receiving the output signal and supplying the output signal to a remote location.

13. A caliper, as in claim 1, in which the contact surface has an edge with all points on the edge being equidistant from the pivot point.

14. A caliper, as in claim 1, in which the tips of the first and second arms and the contact surface comprise rollers.

15. A caliper, as in claim 1, in which:
the predetermined dimension determined by the indicating means is an outside dimension within the first range of values when the tip of the first arm, the tip of the second arm, and the contact surface simultaneously contact three nondiametrically opposed points on an outside surface of the object;
the predetermined dimension determined by the indicating means is an outside dimension within the second range of values when the tip of the first arm and the tip of the second arm simultaneously contact two diametrically opposed points on an outside surface of the object;
the predetermined dimension determined by the indicating means is an inside dimension within a third range of values when the tip of the first arm, the tip of the second arm, and the contact surface simultaneously contact three nondiametrically opposed points on an inside surface of the object;
the predetermined dimension determined by the indicating means is an inside dimension within a fourth range of values, the values in the third range being different from the values in the fourth range, when the tip of the first arm and the tip of the second arm simultaneously contact two diametrically opposed points on an inside surface of the object.

16. A caliper for measuring a predetermined dimension of an object, comprising:
a first elongated member having a means for contacting a first point on the object;
a second elongated member having a means for contacting a second point on the object;
a means for connecting the first and second elongated members for rotation about a pivot point, the pivot point being spaced apart from the means for contacting a first point and the means for contacting a second point;
a means connected to one of the elongated members for contacting a third point on the object; and
a means responsive to the relative position of the first and second elongated members for indicating the predetermined dimension of the object within a first range of values when the means for contacting a first point, means for contacting a second point, and means for contacting a third point simultaneously contact three nondiametrically opposed points on a surface of the object, the predetermined dimension having a predetermined relationship to the length of a first line segment extending from the means for contacting a first point on the object to the means for contacting a second point on the object and the length of a second line segment which is perpendicular to the first line segment and extends from the midpoint of the first line segment to the means for contacting a third point on the object, the indicating means also determining the predetermined dimension of an object within a second range of values when the means for contacting a first point and the means for contacting a second point simultaneously contact two diametrically opposed points on the surface of the object, the values in the first range being different from the values in the second range.

17. A caliper, as in claim 16, in which the predetermined dimension is the diameter.

18. A caliper, as in claim 16, in which the predetermined dimension is the radius.

19. A caliper, as in claim 16, in which the predetermined dimension is the circumference.

20. A caliper, as in claim 16, in which the predetermined dimension is the cross-sectional area.

21. A caliper, as in claim 16, in which the means for contacting a first point comprises a tip, the means for contacting a second point comprises a tip, and the means for contacting a third point comprises a contact surface having an edge with all points on the edge being equidistant from the pivot point.

22. A caliper, as in claim 16, in which the means for contacting a first point comprises a roller, the means for contacting a second point comprises a roller, and the means for contacting a third point comprises a roller.

23. A caliper, as in claim 16, in which the indicating means comprises:
a pointer on the first elongated member; and
a scale on the second elongated member, the scale being calibrated so that the position of the pointer with respect to the scale provides an indication of the predetermined dimension when the means for contacting a first point, means for contacting a second point, and means for contacting a third point simultaneously contact three nondiametrically opposed points on a surface of the object.

24. A caliper, as in claim 16, in which the indicating means comprises:
a means for producing a first signal related to the angle between the first and second elongated members; and
a means responsive to the first signal for producing an output signal indicative of the predetermined dimension.

25. A caliper, as in claim 24, in which the means for producing the first signal comprises a potentiometer having a resistor connected to the second elongated member and a wiper connected to the first elongated member.

26. A caliper as in claim 25, in which the means responsive to the first signal comprises:
an analog-to-digital converter connected to the wiper for converting the first signal to a digital signal; and
a logic means connected to the analog-to-digital converter and responsive to the digital signal for determining the predetermined dimension and producing the output signal.

27. A caliper, as in claim 26, in which the indicating means further comprises means connected to the logic means for selecting either the diameter, radius, circumference, or cross-sectional area as the predetermined dimension and for selecting the units in which the predetermined dimension will be indicated.

28. A caliper, as in claim in which the indicating means further comprises;
a display means responsive to the output signal for displaying the predetermined dimension; and
an output port for receiving the output signal and supplying the output signal to a remote location.

29. A caliper, as in claim 16, in which:
the predetermined dimension determined by the indicating means is an outside dimension within the first range of values when the means for contacting a first point, means for contacting a second point, and means for contacting a third point simultaneously contact three nondiametrically opposed points on an outside surface of the object;
the predetermined dimension determined by the indicating means is an outside dimension within the second range of values when the means for contacting a first point and the means for contacting a second point simultaneously contact two diametrically opposed points on an outside surface of the object;
the predetermined dimension determined by the indicating means is an inside dimension within a third range of values when the means for contacting a first point, means for contacting a second point, and means for contacting a third point simultaneously contact three nondiametrically opposed points on an inside surface of the object;
the predetermined dimension determined by the indicating means is an inside dimension within a fourth range of values, the values in the third range, being different from the values in the fourth range when the means for contacting a first point and the means for contacting a second point simultaneously contact two diametrically opposed points on an inside surface of the object.

* * * * *